United States Patent
Gu et al.

(10) Patent No.: US 8,036,291 B2
(45) Date of Patent: Oct. 11, 2011

(54) TIME DOMAIN BASED APPROACH FOR FAST FADING CHANNEL FFT TRIGGER POINT TRACKING IN ISDB RECEIVERS

(75) Inventors: Yongru Gu, Lake Forest, CA (US); Jun Ma, Xian (CN)

(73) Assignee: Newport Media, Inc., Lake Forest, CA (US)

( * ) Notice: Subject to any disclaimer, the term of this patent is extended or adjusted under 35 U.S.C. 154(b) by 837 days.

(21) Appl. No.: 12/107,986

(22) Filed: Apr. 23, 2008

(65) Prior Publication Data

US 2009/0268826 A1    Oct. 29, 2009

(51) Int. Cl.
H04L 27/28 (2006.01)
(52) U.S. Cl. ........................................................ 375/260
(58) Field of Classification Search .................. 342/196; 708/404, 405; 379/406.13; 370/210, 395.62, 370/507; 375/240.18, 260, 354, 357, 369, 375/372, 373, 374; 455/59, 265; 702/89; 713/375, 400

See application file for complete search history.

(56) References Cited

U.S. PATENT DOCUMENTS

| 7,693,129 B1 * | 4/2010 | Kishore et al. ................. 370/350 |
| 2007/0092044 A1 * | 4/2007 | Wang et al. .................... 375/343 |

* cited by examiner

Primary Examiner — Sam K Ahn
(74) Attorney, Agent, or Firm — Rahman LLC

(57) ABSTRACT

A method of fast fading channel Fast Fourier Transform (FFT) trigger point tracking in an integrated services digital broadcasting (ISDB) receiver includes inputting a signal in a fading channel including N Orthogonal Frequency Division Multiplexing (OFDM) symbols, determining an average correlation result of a current time-domain sample of the signal and a previous time-domain sample taken previously of the signal, accumulating the average correlation result for at least one of the OFDM symbols, determining a peak of the average correlation result to obtain a peak position, and identifying the peak position as a trigger point of the input signal. The peak position may be compared with a first trigger point to generate a trigger point error signal. The first trigger point may be set at the middle of a guard of an OFDM symbol to generate the trigger point error signal.

20 Claims, 4 Drawing Sheets

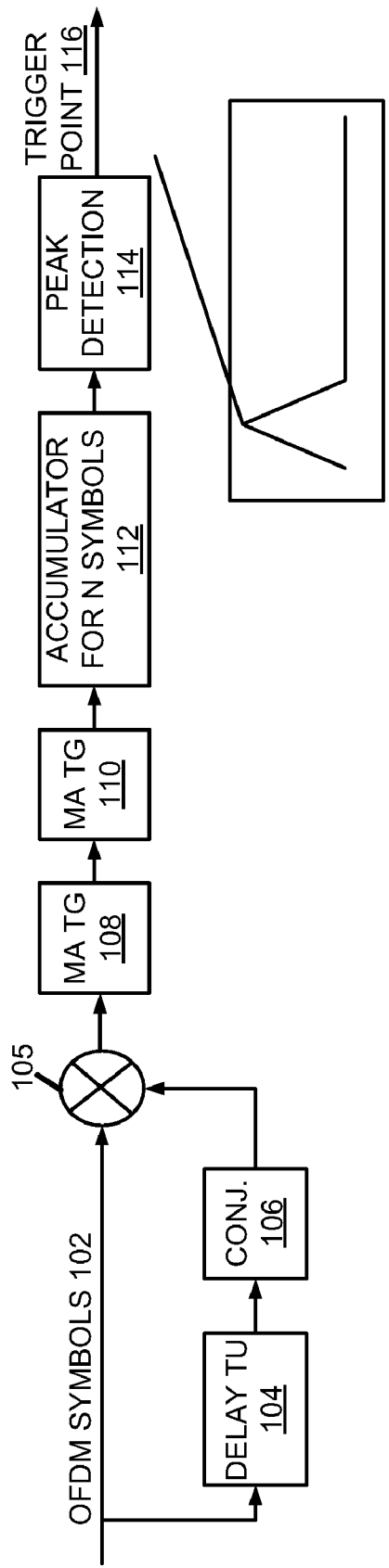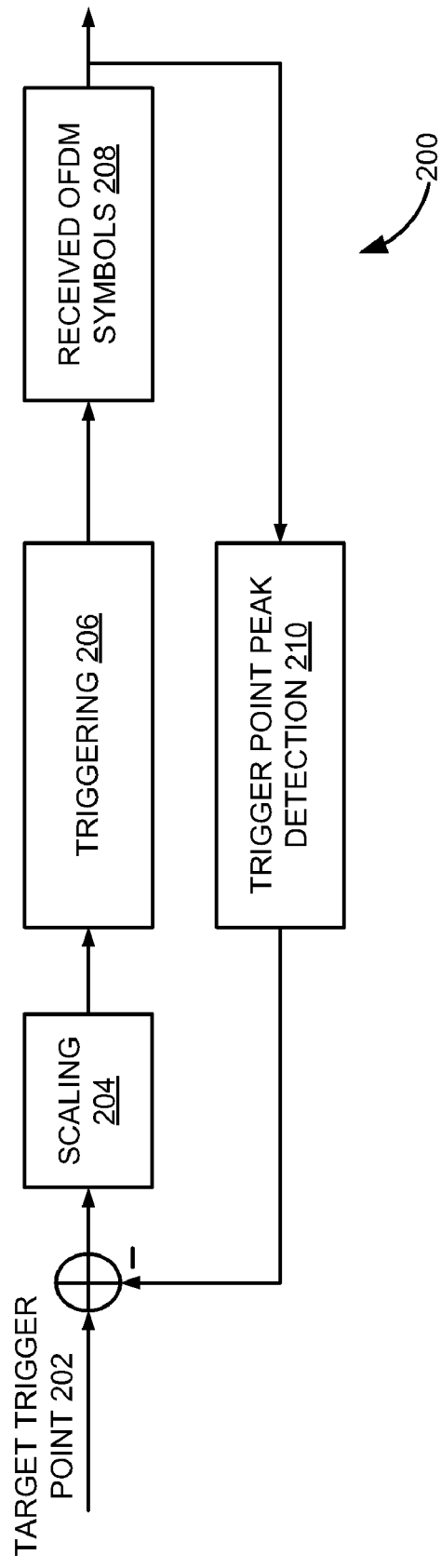
FIG. 1
FIG. 2

TIME DOMAIN BASED APPROACH FOR FAST FADING CHANNEL FFT TRIGGER POINT TRACKING IN ISDB RECEIVERS

BACKGROUND

1. Technical Field

The embodiments herein generally relate to wireless communication systems, and, more particularly, to a fast fading channel Fast Fourier Transform (FFT) trigger point tracking in Integrated Services Digital Broadcasting (ISDB) receivers.

2. Description of the Related Art

Orthogonal Frequency Division Multiplexing (OFDM) is a digital data modulating technique, which uses a large number of closely spaced orthogonal sub-carriers. The digital data is modulated to an amplitude and a phase of each of the orthogonal sub-carriers within a transmission band. In a digital broadcasting receiver design of ISDB receivers such as Integrated Services Digital Broadcasting-terrestrial (ISDB-T) and Integrated Services Digital Broadcasting-terrestrial digital sound broadcasting (ISDB-TSB) for OFDM systems, a major challenge lies in FFT trigger point tracking.

Terrestrial digital broadcasting using an OFDM method is susceptible to inter-symbol interference of multiple sub-carrier waves; the signal obtained is a composite wave resulting from the combination of the multiple sub-carrier waves received by an OFDM receiver. This causes fading (e.g., distortion in a carrier-modulated signal) of the transmitted OFDM symbols. The inter-symbol interference may be avoided by a FFT computation. In an OFDM receiver, the FFT computation such as trigger point tracking is performed by an FFT computing circuit in the receiver, by which the received OFDM signal is demodulated.

Trigger point is a point at which the sampling of an input signal starts. The traditional method for FFT trigger point tracking is based on a channel impulse response of the received OFDM signal. The channel impulse response refers to an output signal (an infinitely high peak) obtained for an input signal in a communication channel. The channel impulse response is usually obtained by performing an inverse FFT (IFFT) of the time-domain interpolated channel estimates or performing an IFFT on the scatter pilots.

For fast fading channel as in OFDM systems, performing an IFFT of the time-domain interpolated channel estimates or on the scatter pilots typically leads to degradation, noisy channel estimates, a short channel impulse response (e.g., due to limited scatter pilot spacing), aliasing (e.g., distortion of a frequency in a signal), and an incorrect trigger point adjustment.

For example, two trigger points which are Tu/12 (e.g., Tu is the useful OFDM symbol time in ISDB-T and ISDB-TSB) apart have the same channel impulse response and generally cannot be distinguished. This poses a problem while interpolating the channel in the frequency domain. Hence, the traditional method of performing an IFFT based on the channel impulse response in the frequency domain is generally not successful in FFT trigger point tracking.

SUMMARY

In view of the foregoing, an embodiment herein provides a method of fast fading channel FFT trigger point tracking in an ISDB receiver, and a program storage device readable by computer, tangibly embodying a program of instructions executable by the computer to perform the method of fast fading channel FFT trigger point tracking in an ISDB receiver. The method includes inputting a signal in a fading channel including N OFDM symbols, determining an average correlation result of a current time-domain sample of the signal and a previous time-domain sample taken previously of the signal, accumulating the average correlation result for one or more of the OFDM symbols, determining a peak of the average correlation result to obtain a peak position, and identifying the peak position as a trigger point of the input signal.

The peak position may be compared with a first trigger point to generate a trigger point error signal. The first trigger point may be set at the middle of a guard of an OFDM symbol to generate the trigger point error signal. The trigger point error signal may be scaled by a factor of 1/K, the K is programmable. A second trigger point may be obtained by adding the first trigger point with the scaled trigger point error signal, and selecting the second trigger point as a correct trigger point of the input signal. The correct trigger point may be adjusted for every N OFDM symbols. The average correlation result may include a moving average correlation result.

Another embodiment provides an apparatus for performing fast fading channel FFT trigger point tracking in an ISDB receiver, wherein the apparatus includes a memory unit having a set of computer programmable instructions, a display unit operatively connected to the memory unit, a processor that executes the computer programmable instructions and processes a signal in a fading channel including N OFDM symbols, a pair of moving average filters that determine an average correlation result of a current time-domain sample of the signal and a previous time-domain sample taken previously of the signal, an accumulator that accumulates the average correlation result for one or more of the OFDM symbols, and a peak detector that determines a peak of the average correlation result to obtain a peak position, and identifies the peak position as a trigger point of the input signal.

The peak detector may compare the peak position with a first trigger point to generate a trigger point error signal. The first trigger point may be set at the middle of a guard of an OFDM symbol to generate the trigger point error signal. A scaling block may scale the trigger point error signal by a factor of 1/K, the K is programmable. In addition, the scaling block may obtain a second trigger point by adding the first trigger point with the scaled trigger point error signal, and a trigger point peak detection block selects the second trigger point as a correct trigger point of the input signal. The trigger point peak detection block may adjust the correct trigger point for every N OFDM symbols.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 1 is a block diagram illustrating trigger point peak detection for fast fading channel FFT in an ISDB-T and ISDB-TSB receiver according to an embodiment herein;

FIG. 2 is a block diagram illustrating the feedback for trigger point tracking for fast fading channel FFT in a ISDB-T and ISDB-TSB receiver according to an embodiment herein;

DETAILED DESCRIPTION OF PREFERRED EMBODIMENTS

Figure 3:
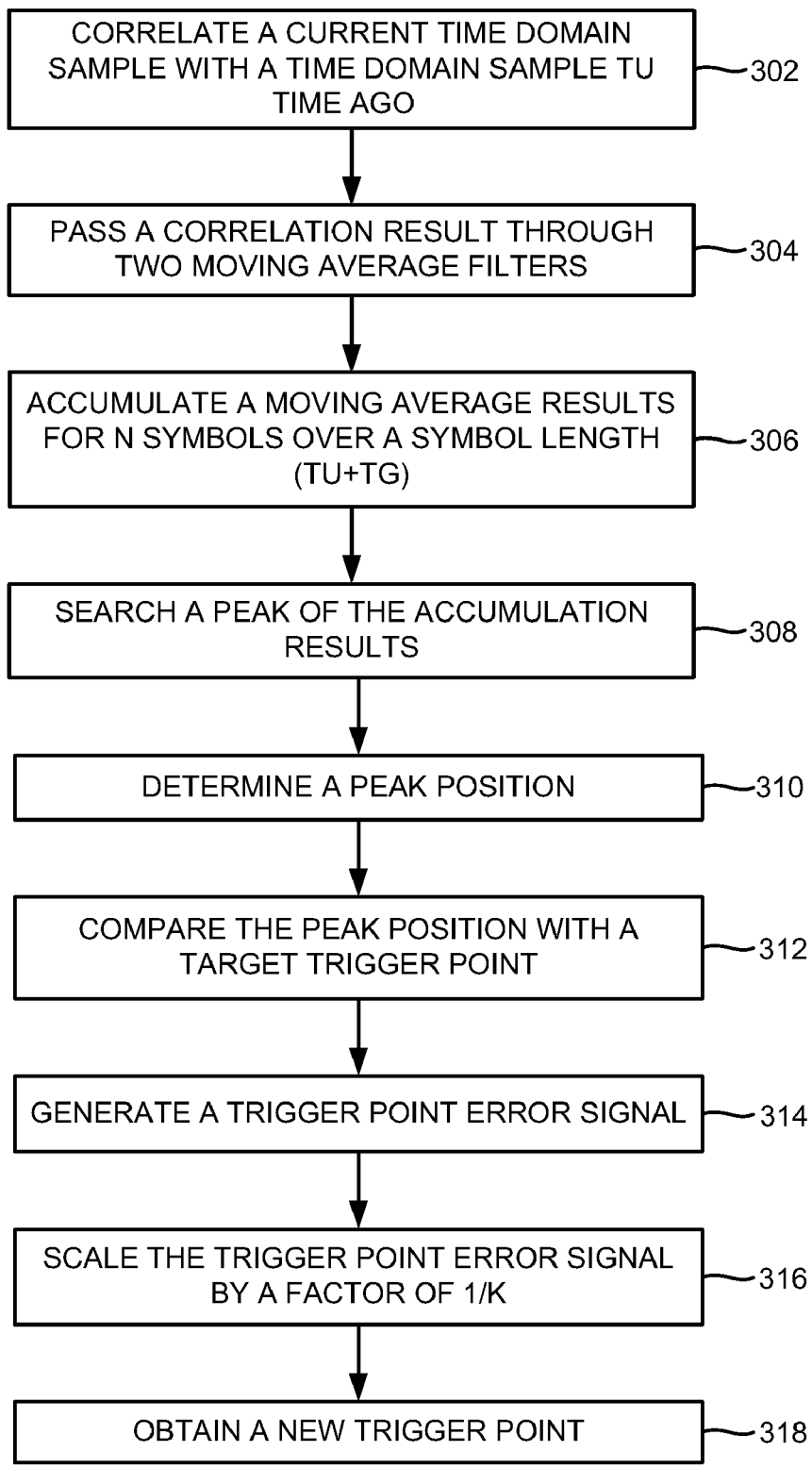
FIG. 3 is a flow diagram illustrating a method for fast fading channel FFT trigger point tracking according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Referring now to the drawings, and more particularly to FIGS. 1 through 5, where similar reference characters denote corresponding features consistently throughout the figures, there are shown preferred embodiments. The embodiments herein provide a time-domain based approach to estimate a fast fading channel FFT trigger point tracking in an ISDB-T and ISDB-TSB receivers 100 to obtain a correct trigger point. Average correlation results of the time domain sample are obtained using moving average filters MA Tg 108, 110 of FIG. 1 and are averaged and accumulated. The peak of the average correlation results is found and compared with a target trigger point to generate a trigger point error signal, which is scaled by a factor of 1/K. A new trigger point is obtained by adding the previously trigger point with the scaled trigger point error signal.

FIG. 1 is a block diagram illustrating a trigger point peak detection for a fast fading channel FFT in an ISDB-T and ISDB-TSB receiver 100 having OFDM symbols 102, a delay Tu block 104, a conjugate (conj.) block 106, a moving average (MA) filter Tg 108, a moving average (MA) filter Tg 110, an accumulator 112 for N symbols, and a peak detection block 114, which yields a trigger point 116 according to an embodiment herein. The OFDM symbols 102 pass through the delay Tu block 104 and conj. block 106. The delay Tu block 104 is delayed by a time Tu. The conjugate (conj.) block 106 flips the sign of quadrature part of the OFDM symbol samples.

In one embodiment, a current time-domain sample of ISDB-T and ISDB-TSB correlates with the time-domain sample Tu taken previously (e.g., the delay Tu block 104, the conjugate (conj.) block 106 and the multiplier 105 perform the correlation). The correlation results are passed through the moving average filter MA Tg 108 and the moving average MA Tg 110. The MA filter Tg 108 and the MA filter Tg 110 average the correlation results. The MA filter Tg 108 and the MA filter Tg 110 have a moving average size of Tg, where Tg is a guard interval time. The accumulator 112 for N symbols then accumulates the averaged results.

The peak detection block 114 obtains the accumulated results and detects the peak position by searching for a peak from the accumulated results. The peak is obtained from the accumulator 112 for N symbols. The peak detection block 114 thereafter identifies the trigger point 116 as corresponding to the peak position. In one embodiment, the moving average (MA) results are then accumulated for N symbols over a symbol length (Tu+Tg) in the accumulator 112 for N symbols. The obtained peak position is compared with a predetermined target trigger point. For example, a target trigger point or a desired trigger point may be set at the middle of the guard of an OFDM symbol to generate a trigger point error signal.

FIG. 2 is a block diagram of a feedback control system 200 for trigger point tracking for the fast fading channel FFT in the ISDB-T and ISDB-TSB receiver 100 (of FIG. 1) having a target trigger point 202, a scaling block 204, a triggering block 206, a received OFDM symbols block 208, and a trigger point peak detection block 210 according to an embodiment herein.

The obtained trigger point (e.g., the trigger point 116 from the peak detection block 114 of FIG. 1) is compared with the target trigger point 202 to obtain a new trigger point. The target trigger point 202 is set at the middle of the guard of an OFDM symbol to generate a trigger point error signal. The scaling block 204 scales the obtained trigger point error signal by a factor of 1/K, where K is a programmable parameter.

A new trigger point is obtained by summing a previous trigger point and the scaled trigger point error signal. The new trigger point is obtained by using the formula: Trig(n)=Trig(n−N)+Adjustment in the triggering block 206. The received OFDM symbols block 208 then receives the new trigger point. The trigger point peak detection block 210 detects the peak of the new trigger point. The system 200 updates the trigger point for every N symbols. The peak of the new trigger point 210 is compared with the target trigger point 202. The above steps are repeated and the trigger point is adjusted for every N symbols.

FIG. 3, with reference to FIGS. 1 and 2, is a flow diagram illustrating a method for the fast fading channel FFT trigger point tracking according to an embodiment herein. In step 302, a current time domain sample is correlated with a time domain sample Tu of a previous time. In step 304, the correlation results are passed through the moving average (MA) filter Tg 108, and the MA filter Tg 110. In step 306, the moving average results are accumulated for N symbols over a symbol length (Tu+Tg) (e.g., using the accumulator 112 for N symbols). In step 308, the peak of the accumulation results is searched.

In step 310, a peak position is determined (e.g., using the peak detection block 114) after accumulating for N symbols. In step 312, the peak position is compared with a target trigger point (e.g., the target trigger point 202 of FIG. 2). In step 314, a trigger point error signal is generated. In step 316, the trigger point error signal is scaled by a factor of 1/K (e.g., using the scaling block 204). In step 318, a new trigger point is obtained. In another embodiment, the new trigger point is obtained by summation of the previous trigger point and the scaled trigger point error signal. The steps from 302 may be repeated for N number of symbols.

Figure 4:
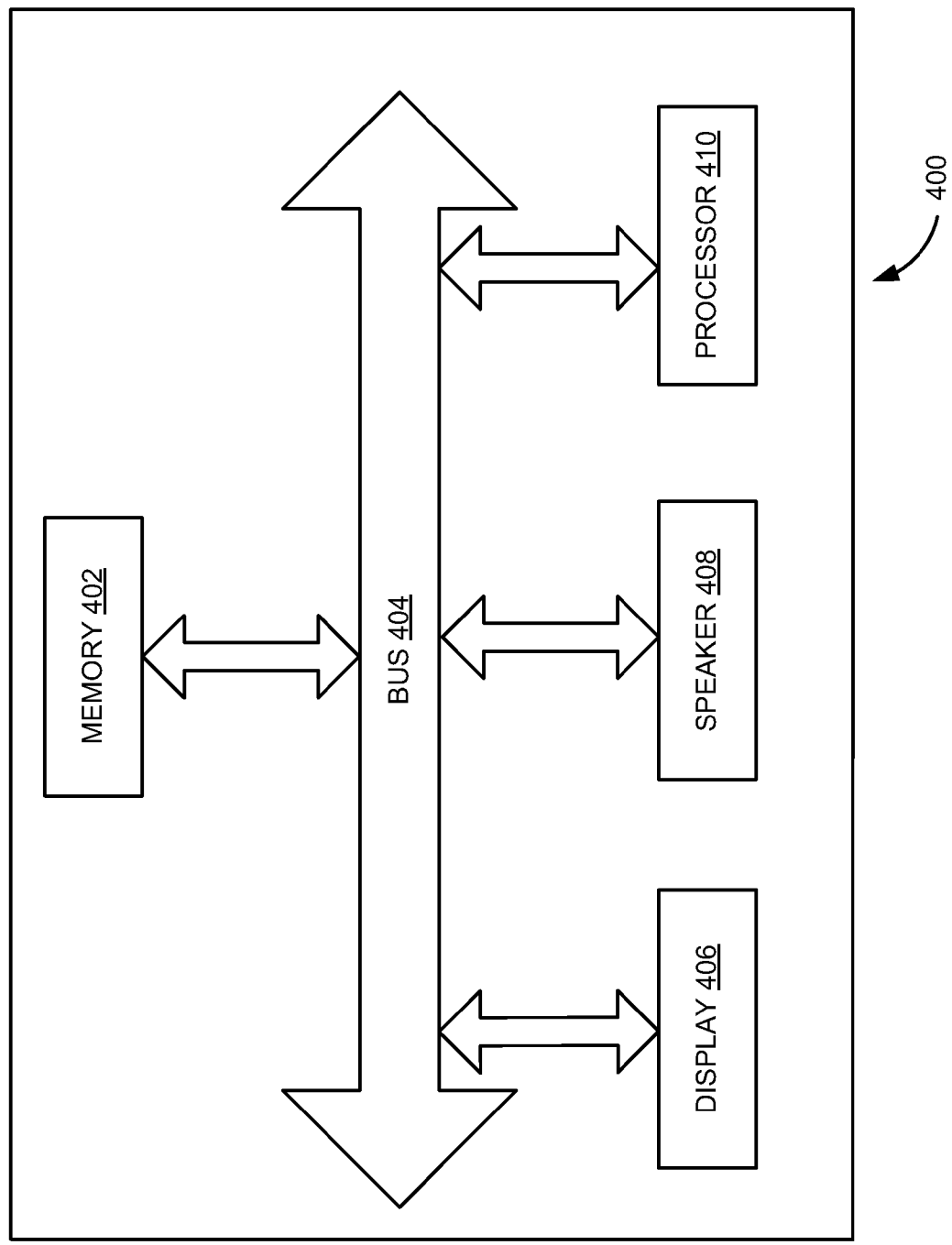
FIG. 4 is a schematic diagram illustrating a mobile TV receiver according to an embodiment herein.

FIG. 4 illustrates an exploded view of a mobile TV receiver 400 having a memory 402 with a computer set of instructions, a bus 404, a display 406, a speaker 408, and a processor 410 capable of processing the set of instructions to perform any one or more of the methodologies herein. The processor 410 may also enable frequency samples to be consumed in the form of one or more displays 406 or audio for output via speaker and/or earphones 408. The processor 410 carries out the methods described herein and in accordance with the embodiments herein. The received frequency domain sample may also be stored in the memory 402 for future processing or consumption. The memory 402 may also store specific information about the frequency domain sample available in the future or stored from the past. When the sample is selected, the processor 410 may pass information. The information may be passed among functions within mobile TV receiver 400 using the bus 404.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of an entirely hardware embodiment, an entirely software embodiment or an embodiment including both hardware and software elements. The embodiments that are implemented in software include but are not limited to, firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 5:
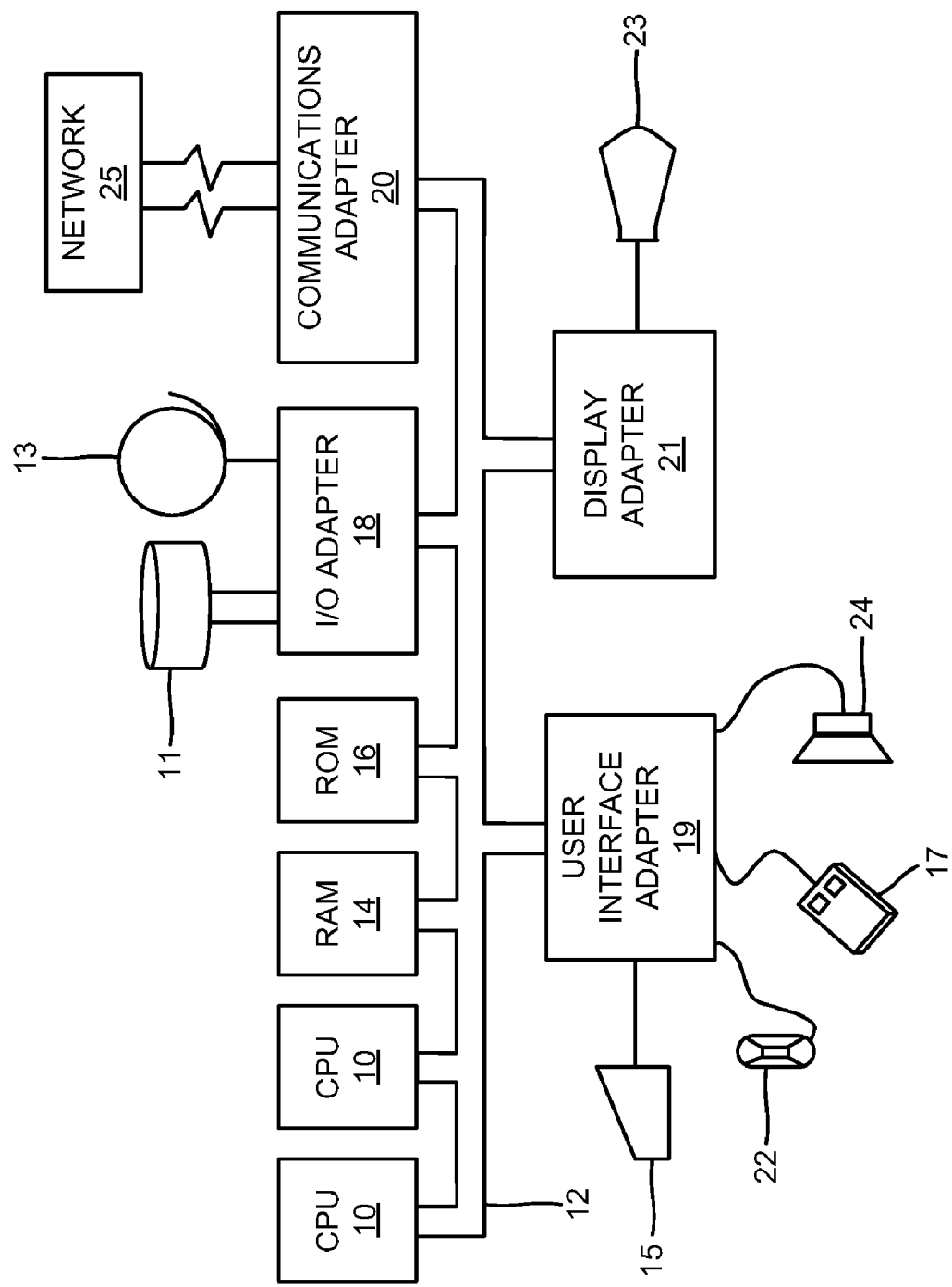
FIG. 5 is a schematic diagram illustrating a computer architecture according to an embodiment herein.

A representative hardware environment for practicing the embodiments herein is depicted in FIG. 5. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The embodiments herein provide a time-domain based approach for fast fading channel FFT trigger point tracking in an ISDB-T and ISDB-TSB receiver 100 overcomes the problem of the FFT calculated by the time-domain interpolated channel estimates based on scatter pilots which are subject to degradation, noisy channel estimates, aliasing and lead to a poor channel impulse response. Also, the embodiments herein are advantageous over the estimation of channel impulse based on the IFFT of the scatter pilots technique, which due to the limitation in scatter pilot spacing can only see a very short channel impulse response.

Generally, the time-domain based approach to estimate the fast fading channel in an ISDB-T and ISDB-TSB receiver 100 provided by the embodiments herein is useful in obtaining the correct trigger point. The average correlation results of the time domain sample obtained using moving average filters Tg 108, 110 are averaged and accumulated. The peak of the results is found (which is the trigger point 116) and compared with a target trigger point 202 to generate a trigger point error signal, which is scaled by a factor of 1/K. The new trigger point is obtained by adding the old trigger point with the scaled trigger point error signal.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method of fast fading channel Fast Fourier Transform (FFT) trigger point tracking in an integrated services digital broadcasting (ISDB) receiver, said method comprising:
inputting a signal in a fading channel comprising N Orthogonal Frequency Division Multiplexing (OFDM) symbols, wherein said N is a number;
determining an average correlation result of a current time-domain sample of said signal and a previous time-domain sample taken previously of said signal;
accumulating said average correlation result for at least one of said OFDM symbols;
determining a peak of said average correlation result to obtain a peak position;
identifying said peak position as a trigger point of said input signal; and
comparing said peak position with a first trigger point to generate a trigger point error signal,
wherein said first trigger point is set at the middle of a guard of at least one of said OFDM symbols to generate said trigger point error signal.

2. The method of claim 1, wherein said ISDB receiver comprises an ISDB-T receiver.

3. The method of claim 1, wherein said ISDB receiver comprises an ISDB-TSB receiver.

4. The method of claim 2, further comprising scaling said trigger point error signal by a factor of 1/K, wherein said K is programmable.

5. The method of claim 4, further comprising:
obtaining a second trigger point by adding said first trigger point with said scaled trigger point error signal; and
selecting said second trigger point as a correct trigger point of said input signal.

6. The method of claim 5, further comprising adjusting said correct trigger point for every said N OFDM symbols.

7. The method of claim 1, wherein said average correlation result comprises a moving average correlation result.

8. A non-transitory program storage device readable by computer, tangibly embodying a program of instructions executable by said computer to perform a method of fast fading channel Fast Fourier Transform (FFT) trigger point tracking in an integrated services digital broadcasting (ISDB) receiver, said method comprising:
inputting a signal in a fading channel comprising N Orthogonal Frequency Division Multiplexing (OFDM) symbols, wherein said N is a number;
determining an average correlation result of a current time-domain sample of said signal and a previous time-domain sample taken previously of said signal;
accumulating said average correlation result for at least one of said OFDM symbols;
determining a peak of said average correlation result to obtain a peak position;
identifying said peak position as a trigger point of said input signal; and
comparing said peak position with a first trigger point to generate a trigger point error signal,
wherein said first trigger point is set at the middle of a guard of at least one of said OFDM symbols to generate said trigger point error signal.

9. The program storage device of claim 8, wherein said ISDB receiver comprises an ISDB-T receiver.

10. The program storage device of claim 8, wherein said ISDB receiver comprises an ISDB-TSB receiver.

11. The program storage device of claim 9, wherein said method further comprises scaling said trigger point error signal by a factor of 1/K, wherein said K is programmable.

12. The program storage device of claim 11, wherein said method further comprises:
obtaining a second trigger point by adding said first trigger point with said scaled trigger point error signal; and
selecting said second trigger point as a correct trigger point of said input signal.

13. The program storage device of claim 12, wherein said method further comprises adjusting said correct trigger point every said N OFDM symbols.

14. The program storage device of claim 8, wherein said average correlation result comprises a moving average correlation result.

15. An apparatus for performing fast fading channel Fast Fourier Transform (FFT) trigger point tracking in an integrated services digital broadcasting (ISDB) receiver, wherein said apparatus comprises:
a memory unit comprising a set of computer programmable instructions;
a display unit operatively connected to said memory unit;
a processor that executes said computer programmable instructions and processes a signal in a fading channel comprising N Orthogonal Frequency Division Multiplexing (OFDM) symbols, wherein said N comprises a number;
a pair of moving average filters that determine an average correlation result of a current time-domain sample of said signal and a previous time-domain sample taken previously of said signal;
an accumulator that accumulates said average correlation result for at least one of said OFDM symbols; and
a peak detector that determines a peak of said average correlation result to obtain a peak position, and identifies said peak position as a trigger point of said input signal,
wherein said peak detector further compares said peak position with a first trigger point to generate a trigger point error signal, and
wherein said first trigger point is set at the middle of a guard of at least one of said OFDM symbols to generate said trigger point error signal.

16. The apparatus of claim 15, wherein said ISDB receiver comprises an ISDB-T receiver.

17. The apparatus of claim 15, wherein said ISDB receiver comprises an ISDB-TSB receiver.

18. The apparatus of claim 16, wherein further comprising a scaling block that scales said trigger point error signal by a factor of 1/K, wherein said K is programmable.

19. The apparatus of claim 18, further comprising:
a scaling block that obtains a second trigger point by adding said first trigger point with said scaled trigger point error signal; and
a trigger point peak detection block that selects said second trigger point as a correct trigger point of said input signal.

20. The apparatus of claim 19, wherein said trigger point peak detection block adjusts said correct trigger point every said N OFDM symbols.

* * * * *